UNITED STATES PATENT OFFICE.

IENS P. LIHME, OF CLEVELAND, OHIO, ASSIGNOR TO THE GRASSELLI CHEMICAL COMPANY, OF CLEVELAND, OHIO, A CORPORATION OF OHIO.

PROCESS OF MAKING LITHOPONE.

SPECIFICATION forming part of Letters Patent No. 697,731, dated April 15, 1902.

Application filed November 21, 1900. Serial No. 37,236. (No specimens.)

*To all whom it may concern:*

Be it known that I, IENS P. LIHME, a citizen of the United States of America, and a resident of the city of Cleveland, county of Cuyahoga, and State of Ohio, have invented certain new and useful Improvements in Processes of Manufacturing Lithopone, of which the following is a specification.

My invention relates to an improved process for manufacturing lithopone, and has for its object the provision of a cheap, simplified, and more advantageous process for preparing lithopone and one which in addition admits of the manufacture of this product in various qualities or grades and is attended as well by the production of some readily-marketable by-product.

Lithopone, I may state, is a mixture of zinc sulfid and barium sulfate which has lately been placed upon the market as a very desirable material for use in the manufacture of paints or as a substitute for white lead. The standard grade of this product contains 29.4 per cent. of zinc sulfid, which, as will be seen, is a molecular mixture of the two ingredients named.

Quite obviously mixtures of grades different from the above may be prepared by adding varying quantities of the ingredients named or of certain other ingredients in addition, such as kaolin, and then subjecting the whole to a mixing process, the higher grades of the lithopone containing the higher percentages of zinc sulfid. This has up to the present time been the actual method pursued in making commercial lithopone of different grades, although one not eminently satisfactory.

By my improved process now to be described I have done away with the necessity for any mechanical mixture of the ingredients and instead prepare lithopone of any desired grade and in much purer form by a simple process or reaction, which at the same time produces some by-product of marked commercial value and one, preferably, that is easily soluble in water.

Accordingly my improved process for manufacturing lithopone consists, in its preferred form, of bringing about in a single reaction the production and precipitation from an aqueous solution of the desired grade of lithopone while the by-product remains in solution, from which it may be recovered by treating in a suitable manner.

I will now describe some typical methods of practicing my invention, whereby lithopone of any desired grade may be produced. One of the known grades of lithopone as prepared and mixed for the trade contains seventeen per cent. of zinc sulfid. To produce this grade and a by-product of hydrosulfid of sodium, for example, I proceed as follows: The usual precautions, it will be understood, must be taken in preparing or for insuring the purity of the several ingredients used; but these preliminaries do not require description here. Separate aqueous solutions of the following ingredients in the proportions named are prepared: zinc sulfate, one hundred and sixty-one pounds; barium sulfid, three hundred and thirty-eight pounds, and sodium bisulfate one hundred and twenty pounds. These ingredients, it will be recognized, are readily soluble in water. The separate solutions are then mixed and the following chemical reaction at once takes place:

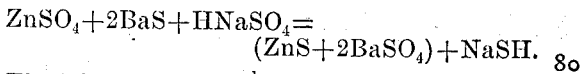

$$ZnSO_4 + 2BaS + HNaSO_4 = (ZnS + 2BaSO_4) + NaSH.$$

Thus five hundred and sixty-three pounds of a seventeen-per-cent. grade of lithopone will be precipitated, from which the soda liquor may be filtered and then washed out. Fifty-six pounds of sodium hydrosulfid may then be recovered from the solution, if no further treatment thereof is contemplated, by any suitable evaporating process. By employing sodium sulfate and suitably altering the reaction I have also produced lithopone and sodium sulfid. The products of these reactions will be found to be of unusual purity and require no subsequent treatment for placing them upon the market.

Should a grade of lithopone be desired higher than the standard grade and another by-product—as, for example, a forty-five-per-cent. grade of lithopone and barium chlorid—the following process may be practiced, which, however, is quite analogous to the one already described. Aqueous solutions of the ingredients are prepared as before, in these proportions: zinc sulfate, one hundred and sixty-one pounds; zinc chlorid, one hundred and thirty-six pounds, and barium sulfid, three hundred and thirty-eight pounds. Upon mixing these several solutions the lithopone will at once be precipitated in accordance with the following reaction:

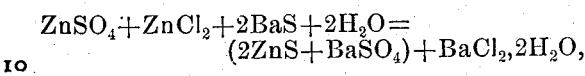

which, upon filtering and evaporating the solution, produces four hundred and twenty-seven pounds of a forty-five-per-cent. grade of lithopone and two hundred and forty-four pounds of barium-chlorid crystals.

The process described is seen to consist of preparing separate solutions of readily-soluble salts of zinc and barium together with a third salt, which will further the reaction and at the same time upon uniting the solutions produce by one set of combinations lithopone and a marketable by-product. This process, moreover, insures the greatest purity of the substances produced and avoids the expense attendant upon more difficult methods in common use. This is particularly true with respect to the manufacture of various grades of lithopone, since by properly calculating the amounts of the ingredients used, as above illustrated, any desired quality of lithopone may be produced without mixing additional substances to increase or decrease the percentage of zinc sulfid. The entire product, too, is an absolutely uniform mixture when prepared in accordance with my process.

From the above description I believe that my invention will be thoroughly understood by those skilled in the art. I do not wish to be understood, however, as limiting my said invention to the precise steps or reactions herein set forth, since these may be widely varied without departing from the spirit of my invention.

I claim, therefore, and desire to secure by these Letters Patent, the following:

1. The process for preparing from solution, lithopone of various grades and a soluble commercial by-product preferably of sodium, which consists in preparing separate solutions of zinc sulfate and barium sulfid, which solutions are mixed with each other and with that of a third salt adapted to enter into combination with a freed acid group from the first-named salts, the same being brought together in equivalent and calculated amounts to produce and precipitate lithopone of the desired percentage, and leave in solution the soluble by-product, substantially as described.

2. The herein-described process for manufacturing lithopone of various grades and a by-product of sodium hydrosulfid, which consists in preparing separate solutions of zinc sulfate and barium sulfid, which solutions are mixed with each other and with that of sodium bisulfate, all in equivalent and calculated amounts to produce and precipitate the desired grade of lithopone and leave the sodium hydrosulfid in solution, substantially as described.

Signed at Cleveland this 13th day of November, 1900.

IENS P. LIHME.

Witnesses:
H. F. J. PREVALDT,
ALBERT LYNN LAWRENCE.